United States Patent
Kimura et al.

(10) Patent No.: US 9,454,160 B2
(45) Date of Patent: Sep. 27, 2016

(54) THERMAL RECYCLING PLANT SYSTEM, APPARATUS FOR CONTROLLING A THERMAL RECYCLING PLANT AND METHOD OF CONTROLLING A THERMAL RECYCLING PLANT

(71) Applicant: KABUSHIKI KAISHA TOSHIBA, Minato-ku (JP)

(72) Inventors: Koji Kimura, Kawasaki (JP); Kenji Mitsumoto, Kawasaki (JP); Kenichi Yamazaki, Kawagoe (JP); Yasuo Sasaki, Kimitsu (JP); Yasushi Kasao, Tokyo (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 634 days.

(21) Appl. No.: 13/775,289

(22) Filed: Feb. 25, 2013

(65) Prior Publication Data

US 2013/0253727 A1    Sep. 26, 2013

Related U.S. Application Data

(63) Continuation of application No. PCT/JP2012/081132, filed on Nov. 30, 2012.

(30) Foreign Application Priority Data

Mar. 21, 2012  (JP) ................. 2012-063366

(51) Int. Cl.
  *G05D 23/00*  (2006.01)
  *G05D 23/19*  (2006.01)
(52) U.S. Cl.
  CPC .......... *G05D 23/00* (2013.01); *G05D 23/1919* (2013.01)

(58) Field of Classification Search
  USPC ......................... 700/300, 295, 276
  See application file for complete search history.

(56) References Cited

U.S. PATENT DOCUMENTS 5,735,134 A * 4/1998 Liu .................. F25B 49/02
                                                62/183
7,340,909 B2 * 3/2008 Kwon ................ F24F 11/006
                                                236/51

(Continued)

FOREIGN PATENT DOCUMENTS

CN        1955598 A       5/2007
CN       101270908 A      9/2008

(Continued)

OTHER PUBLICATIONS

International Search Report mailed Jan. 29, 2013 in PCT/JP2012/081132 filed Nov. 30, 2012.

(Continued)

*Primary Examiner* — Kidest Bahta
(74) *Attorney, Agent, or Firm* — Oblon, McClelland, Maier & Neustadt, L.L.P.

(57) ABSTRACT

According to one embodiment, a thermal recycling plant system includes a cooler cools coolant recycling thermal from coolant circulating in a load apparatus and which consumes energy while operating and a controller controls the cooler. The controller includes a calculator and a monitor. The calculator calculates an optimal temperature optimal for the coolant by optimization calculation for minimizing energy consumption under given conditions. The monitor monitors an operating state of the load apparatus to determine whether an abnormality exists in the load apparatus. The monitor controls the cooler to cool the coolant to a temperature lower than the optimal temperature calculated, on determining that an abnormality exists in the load apparatus.

20 Claims, 14 Drawing Sheets

(56) References Cited

U.S. PATENT DOCUMENTS

| | | | |
|---|---|---|---|
| 2003/0070438 A1* | 4/2003 | Kikuchi | F24F 11/006 62/141 |
| 2004/0008651 A1* | 1/2004 | Ahmed | G05B 15/02 370/338 |
| 2004/0011066 A1 | 1/2004 | Sugihara et al. | |
| 2004/0098993 A1* | 5/2004 | Lee | F25B 13/00 62/160 |
| 2004/0133314 A1* | 7/2004 | Ehlers | F24F 11/0012 700/276 |
| 2007/0095084 A1 | 5/2007 | Park et al. | |
| 2007/0187083 A1* | 8/2007 | Huang | B60H 1/00735 165/202 |
| 2008/0234869 A1* | 9/2008 | Yonezawa | F24F 11/0086 700/276 |
| 2011/0210178 A1 | 9/2011 | Murai et al. | |
| 2012/0055665 A1 | 3/2012 | Morita et al. | |

FOREIGN PATENT DOCUMENTS

| | | |
|---|---|---|
| CN | 102308155 A | 1/2012 |
| JP | 11-63631 | 3/1999 |
| JP | 2004-53127 A | 2/2004 |
| JP | 2004-184052 A | 7/2004 |
| JP | 3783859 B2 | 6/2006 |
| JP | 2007-205605 A | 8/2007 |
| JP | 2007-315695 A | 12/2007 |
| JP | 2008-232531 A | 10/2008 |
| JP | 4166051 B2 | 10/2008 |
| JP | 2010-25466 A | 2/2010 |
| JP | 2010-255985 A | 11/2010 |
| JP | 4630702 B2 | 2/2011 |
| JP | 2011-179755 A | 9/2011 |

OTHER PUBLICATIONS

International Written Opinion mailed Jan. 29, 2013 in PCT/JP2012/081132 filed Nov. 30, 2012.
English translation of the International Search Report issued Jan. 29, 2013, in PCT/JP2012/081132, filed Nov. 30, 2012 (previously filed on Feb. 25, 2013).
International Preliminary Report on Patentability and Written Opinion issued Oct. 2, 2014, in International Application No. PCT/JP2012/081132 (English translation only).
Combined Office Action and Search Report issued Aug. 4, 2015 in Chinese Patent Application No. 201280003800.8 (with English transition).
Office Action issued Sep. 8, 2015 in Japanese Patent Application No. 2012-063366 (with English language translation).
Extended European Search Report issued Nov. 11, 2015 in Patent Application No. 12850733.2.
Office Action issued on Mar. 21, 2016 in Chinese Patent Application No. 201280003800.8 with English translation.

* cited by examiner

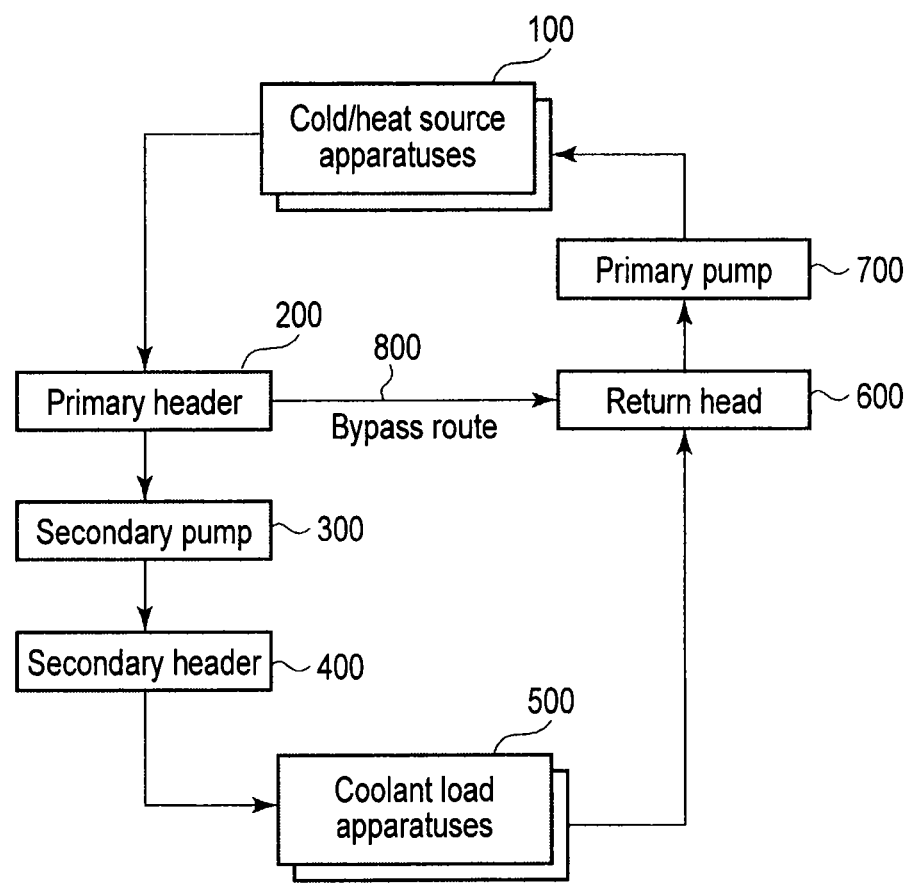
F I G. 1

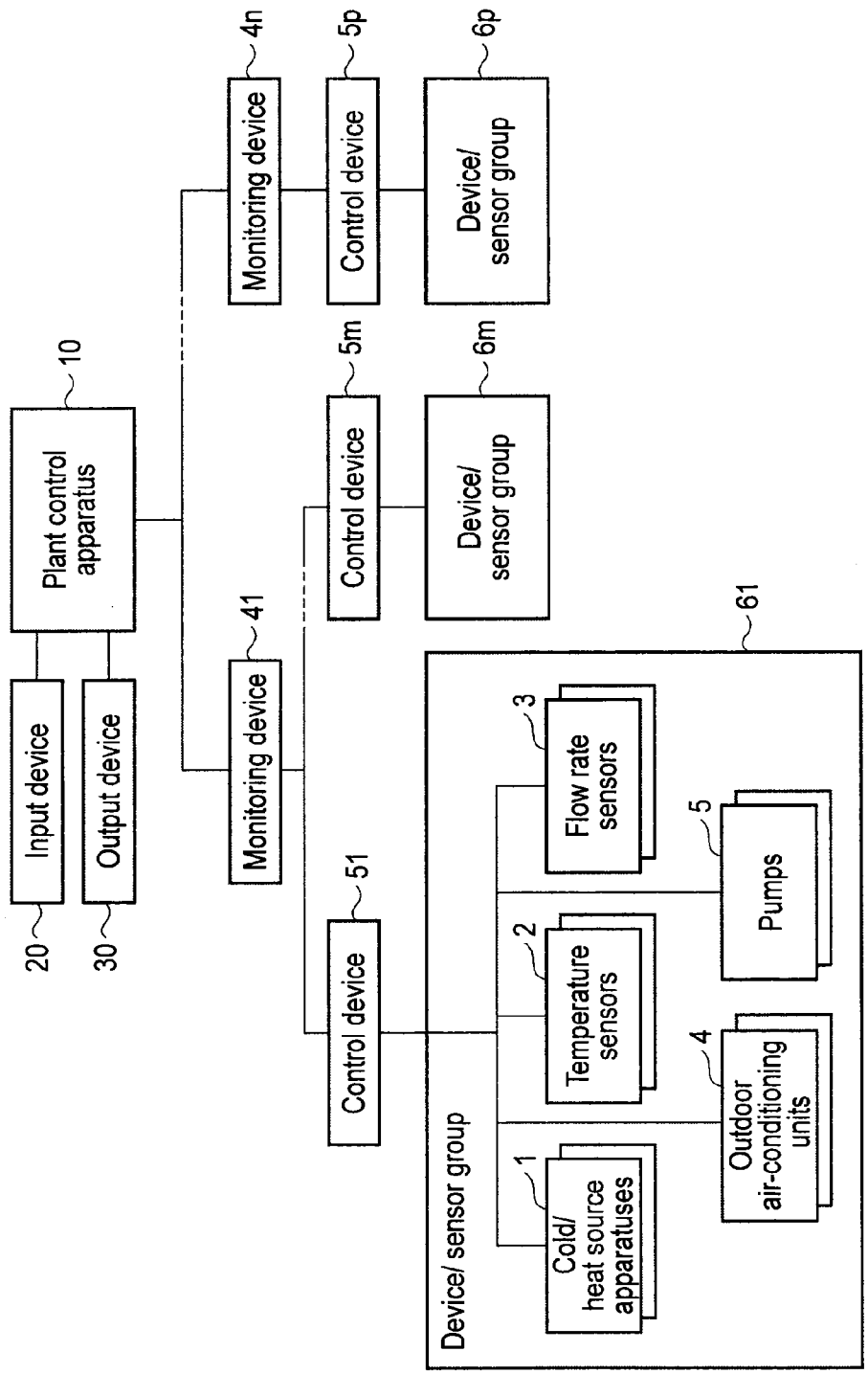
F I G. 2

| | 1 | 2 | 3 | 4 |
|---|---|---|---|---|
| Absolute atmospheric humidity(kg/kgDA) | 0.0080 | 0.0100 | 0.0200 | 0.0350 |
| Upper limit of cold water temperature(°C) | 12.0 | 12.0 | 7.0 | 7.0 |
| Lower limit of cold water temperature(°C) | 6.0 | 6.0 | 6.0 | 6.0 |

> Heat source operating  > State of heat source  > Displaying of parameters

Heat source operating > Cold-water temperature setting range

■ Setting at present

2012/12/15 13:35
Abnormality occurring

■ Execution cycle

| | ※1 | 2 | 3 | 4 | 5 | 6 | 7 | 8 | 9 | 10 |
|---|---|---|---|---|---|---|---|---|---|---|
| Absolute atmospheric humidity(kg/kgDA) | ○ | | | | | | | | | |
| Upper limit of cold water temperature(°C) | | | | | | | | | | |
| Lower limit of cold water temperature(°C) | | | | | | | | | | |
| | ◎ | ○ | ○ | ○ | ○ | ○ | ○ | ○ | ○ | ○ |

[+Insert one column] [−Delete one column]
[Apply the value →]

Absolute atmospheric humidity
[0.0160] kg/kgDA  ⇨ [Calculation]

Dry bulb atmospheric temperature [25.6] °C
Relative atmospheric temperature [80.6] %

☐ Calculate again after setting    [Set]

| Item No. | 1 | 2 | 3 | 4 | 5 |
|---|---|---|---|---|---|
| Absolute atmospheric humidity (kg/kgDA) | 0.0000 | 0.0100 | 0.0200 | 0.0350 | 0.0400 |
| Upper limit of preset coolant temperature (°C) | 12.0 | 12.0 | 7.0 | 7.0 | 7.0 |
| Lower limit of preset coolant temperature (°C) | 6.0 | 6.0 | 6.0 | 6.0 | 6.0 |

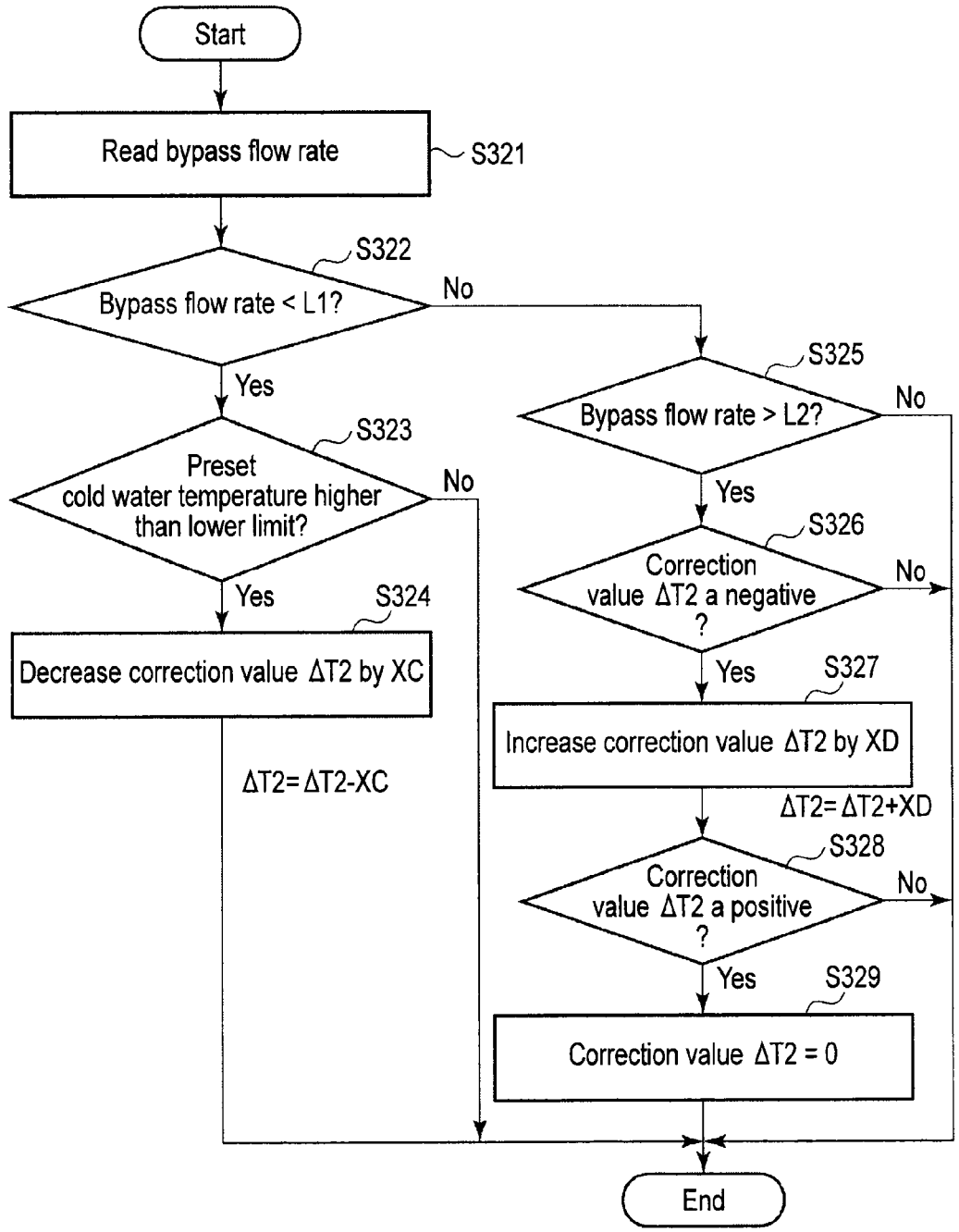
F I G. 12

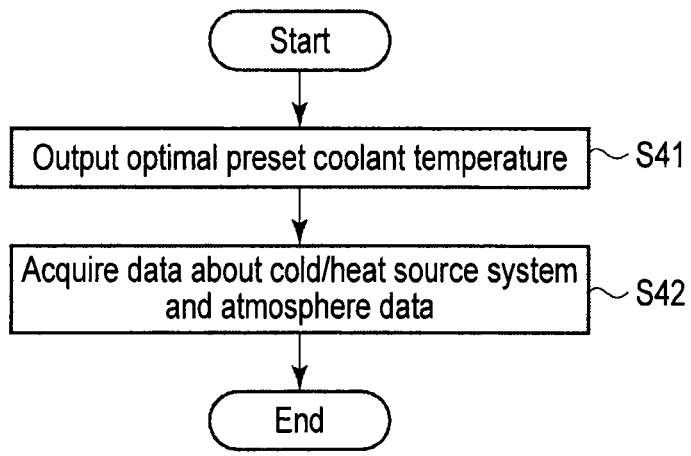
F I G. 13
| Item | Content |
|---|---|
| Interval of calculating preset temp | 10 min. |
| Limited preset coolant temp. change | 3.0°C/h |
| Interval of calculating correction value | 1 min. |
| Change value $\Delta T1$ each time by | 0.017 |
| Change value $\Delta T2$ each time by | 0.017 |
F I G. 14

FIG. 15

| Time | Upper limit (°C) | Optimal preset coolant temperature (°C) | Preset temperature corrected (°C) | Correction by cooling capability monitoring unit 13a | | Correction by bypass flow rate monitoring unit 13b | |
|---|---|---|---|---|---|---|---|
| | | | | Presence/absence of abnormality | Correction value ΔT1 | Presence/absence of abnormality | Correction value ΔT2 |
| 18:30 | 13 | 12.5 | 12.5 | 0 | 0 | 0 | 0 |
| 18:31 | 13 | 12.5 | 12.33 | 0 | 0 | 1 | -0.17 |
| 18:32 | 13 | 12.5 | 12.16 | 0 | 0 | 1 | -0.34 |
| 18:33 | 13 | 12.5 | 11.82 | 1 | -0.17 | 1 | -0.51 |
| 18:34 | 13 | 12.5 | 11.48 | 1 | -0.34 | 1 | -0.68 |
| 18:35 | 13 | 12.5 | 11.14 | 1 | -0.51 | 1 | -0.85 |
| 18:36 | 13 | 12.5 | 10.97 | 1 | -0.68 | 0 | -0.85 |
| 18:37 | 13 | 12.5 | 10.8 | 1 | -0.85 | 0 | -0.85 |
| 18:38 | 13 | 12.5 | 10.8 | 1 | -1.02 | 2 | -0.68 |
| 18:39 | 13 | 12.5 | 10.8 | 1 | -1.19 | 2 | -0.51 |
| 18:40 | 11.5 | 12 | 10.3 | 1 | -1.36 | 2 | -0.34 |
| 18:41 | 11.5 | 12 | 10.64 | 0 | -1.19 | 2 | -0.17 |
| 18:42 | 11.5 | 12 | 10.98 | 0 | -1.02 | 2 | 0 |
| 18:43 | 11.5 | 12 | 11.15 | 0 | -0.85 | 0 | 0 |
| 18:44 | 11.5 | 12 | 11.32 | 0 | -0.68 | 0 | 0 |
| 18:45 | 11.5 | 12 | 11.49 | 0 | -0.51 | 0 | 0 |
| 18:46 | 11.5 | 12 | 11.49 | 0 | -0.34 | 1 | -0.17 |
| 18:47 | 11.5 | 12 | 11.49 | 0 | -0.17 | 1 | -0.34 |
| 18:48 | 11.5 | 12 | 11.49 | 0 | 0 | 1 | -0.51 |
| 18:49 | 11.5 | 12 | 11.49 | 0 | 0 | 1 | -0.51 |
| 18:50 | 11.5 | 11.5 | 10.99 | 0 | 0 | 1 | -0.51 |
| 18:51 | 11.5 | 11.5 | 10.99 | 0 | 0 | 1 | -0.51 |
| 18:52 | 11.5 | 11.5 | 10.99 | 0 | 0 | 0 | -0.51 |
| 18:53 | 11.5 | 11.5 | 10.82 | 0 | 0 | 0 | -0.68 |
| 18:54 | 11.5 | 11.5 | 10.48 | 1 | -0.17 | 1 | -0.85 |

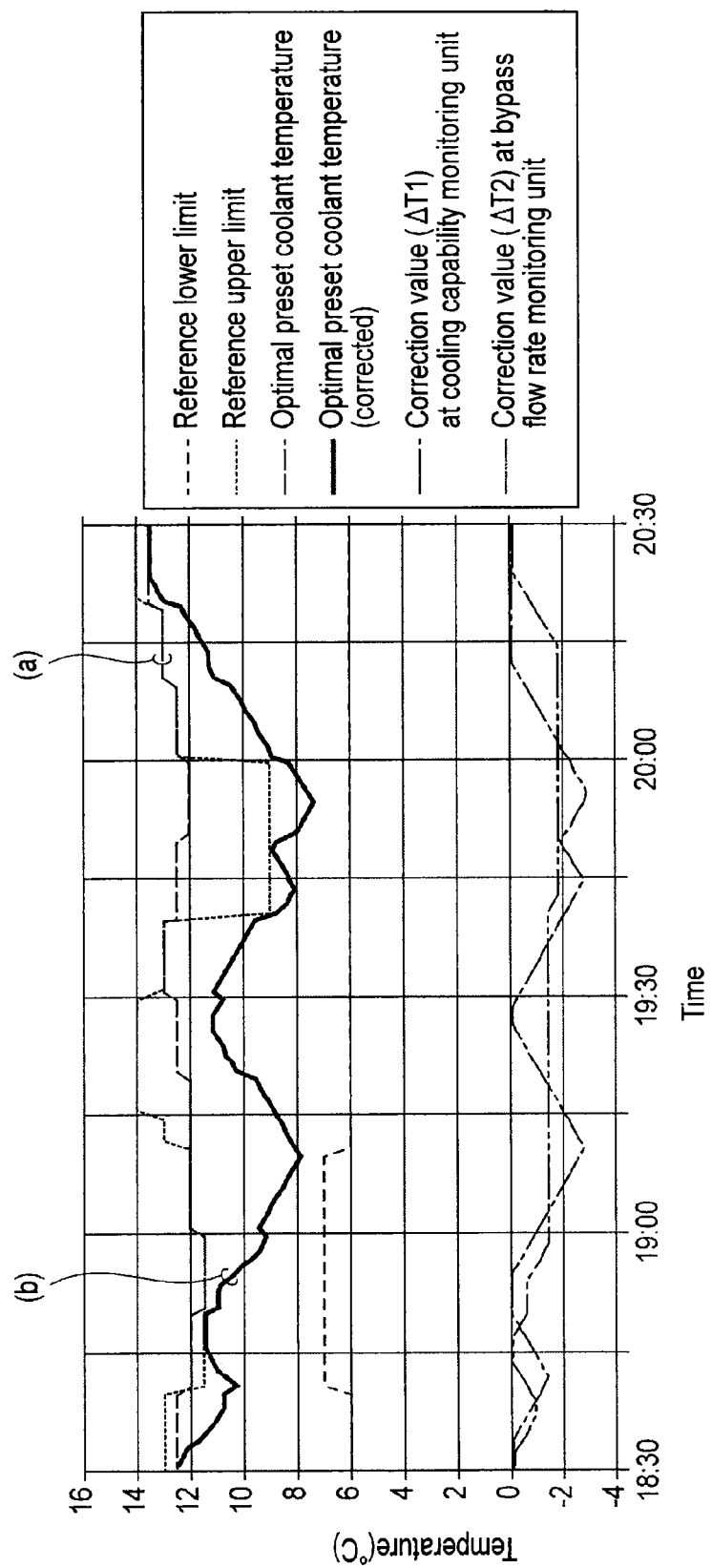
F I G. 16

THERMAL RECYCLING PLANT SYSTEM, APPARATUS FOR CONTROLLING A THERMAL RECYCLING PLANT AND METHOD OF CONTROLLING A THERMAL RECYCLING PLANT

CROSS REFERENCE TO RELATED APPLICATIONS

This application is a Continuation Application of PCT Application No. PCT/JP2012/081132, filed Nov. 30, 2012 and based upon and claiming the benefit of priority from Japanese Patent Application No. 2012-063366, filed Mar. 21, 2012, the entire contents of all of which are incorporated herein by reference.

FIELD

Embodiments described herein relate generally to a thermal recycling plant system for use in controlling air-conditioning in buildings, factories and apartments, an apparatus for controlling a thermal recycling plant, and a method of controlling a thermal recycling plant.

BACKGROUND

In recent years, people have become more conscious of the conservation of the global environment, now demanding that the energy consumption should be reduced. The demand for energy saving is growing. People now request that energy saving legislation should be revised and that conformance to standards such as ISO 50001 should be stipulated. Attention is therefore being paid to techniques that can reduce energy consumption in comparatively large facilities, such as buildings and factories.

A large part of the energy consumed in a facility is used in the air-conditioning system. In some buildings, the air-conditioning system is responsible for half the total energy consumed. Hence, if the energy consumed by the air-conditioning system is decreased, energy will be effectively saved in the building. In view of this, various techniques have been proposed, which efficiently operate the system (hereinafter called the "thermal recycling plant") that recycles thermal generated in the building, thereby raising energy efficiency.

In the existing technique, the control value set to minimize the energy consumption is calculated from the evaluation function based on the specification or operating history of the air-conditioning system. More specifically, the thermal recycling plant is studied as a group of controlled objects, and an optimization based on a modeling technique is performed, thereby calculating the target control values for the respective control objects. In this method, however, the specification or operating states of all components constituting the thermal recycling plant cannot always be taken into consideration. The operating state of the thermal recycling plant depends also on the environmental conditions, such as temperature and humidity. Inevitably, the modeling of the system is limited. Consequently, there may be discrepancy between the control based on calculation and the actual operation of the system.

Assume that, by a calculation for minimize the energy consumption, a temperature (hereinafter referred to as the "preset coolant temperature" is recommended, which is higher than the ordinary value for the coolant temperature optimal at, for example, the output of a cold/heat source apparatus. If the preset temperature is increased, the power to the compressor for cooling the coolant can be reduced, ultimately to decrease the energy consumed in the cold/heat source apparatus. In this respect, the decrease of the preset temperature is theoretically advantageous. However, the cooling capability will decrease, because the temperature difference between the coolant and the any object cooled. As a result, the outdoor air-conditioning unit will have but inadequate dehumidifying capability, and a feedback that lowers the humidity will increase, possibly increasing the energy consumption in some cases.

Used as an index for evaluating the operating state of the thermal recycling plant is the coolant bypass flow rate. The coolant bypass flow rate is an amount in which the coolant flows per unit time flows (or is bypassed) from the outlet port of the chiller recycling thermal from the coolant, to the outlet port of the chiller. This flow rate remains sufficiently high as long as the chiller has sufficient cooling capability. The coolant bypass flow rate, however, lowers if the load (for example, outdoor air-conditioning unit or indoor air-conditioning unit) must operate to achieve cooling. In this case, the standby cold/heat source apparatus is activated before the coolant bypass flow rate falls below a preset value. Thus, the control may be inappropriately performed, in some cases, possibly increasing the energy consumption in the thermal recycling plant in its actual operation, in spite of the target control values calculated for the respective control objects.

BRIEF DESCRIPTION OF THE DRAWINGS

FIG. 1 is a block diagram showing an exemplary thermal recycling plant;

FIG. 2 is a system diagram showing an exemplary thermal recycling plant control system according to an embodiment;

FIG. 5 is a diagram showing another exemplary screen the output device 30 displays;

FIG. 8 is a diagram showing a further exemplary screen that the output device 30 displays;

FIG. 9 is a diagram showing an exemplary preset coolant temperature upper limit table 15a;

FIG. 10 is a flowchart showing an exemplary process sequence a system monitoring unit 13 may perform;

FIG. 12 is a flowchart showing, in detail, a process sequence a bypass flow rate monitoring unit 13b may perform;

FIG. 13 is a flowchart showing an exemplary process sequence a communication process unit 14 may perform;

FIG. 14 is a diagram showing exemplary parameters 15b for calculating the optimal coolant temperature;

FIG. 15 is a table showing exemplary calculated optimal coolant temperatures, arranged in time series;

FIG. 16 is a graph showing how values change for a specific time including the period shown in FIG. 15.

DETAILED DESCRIPTION

Figure 3:
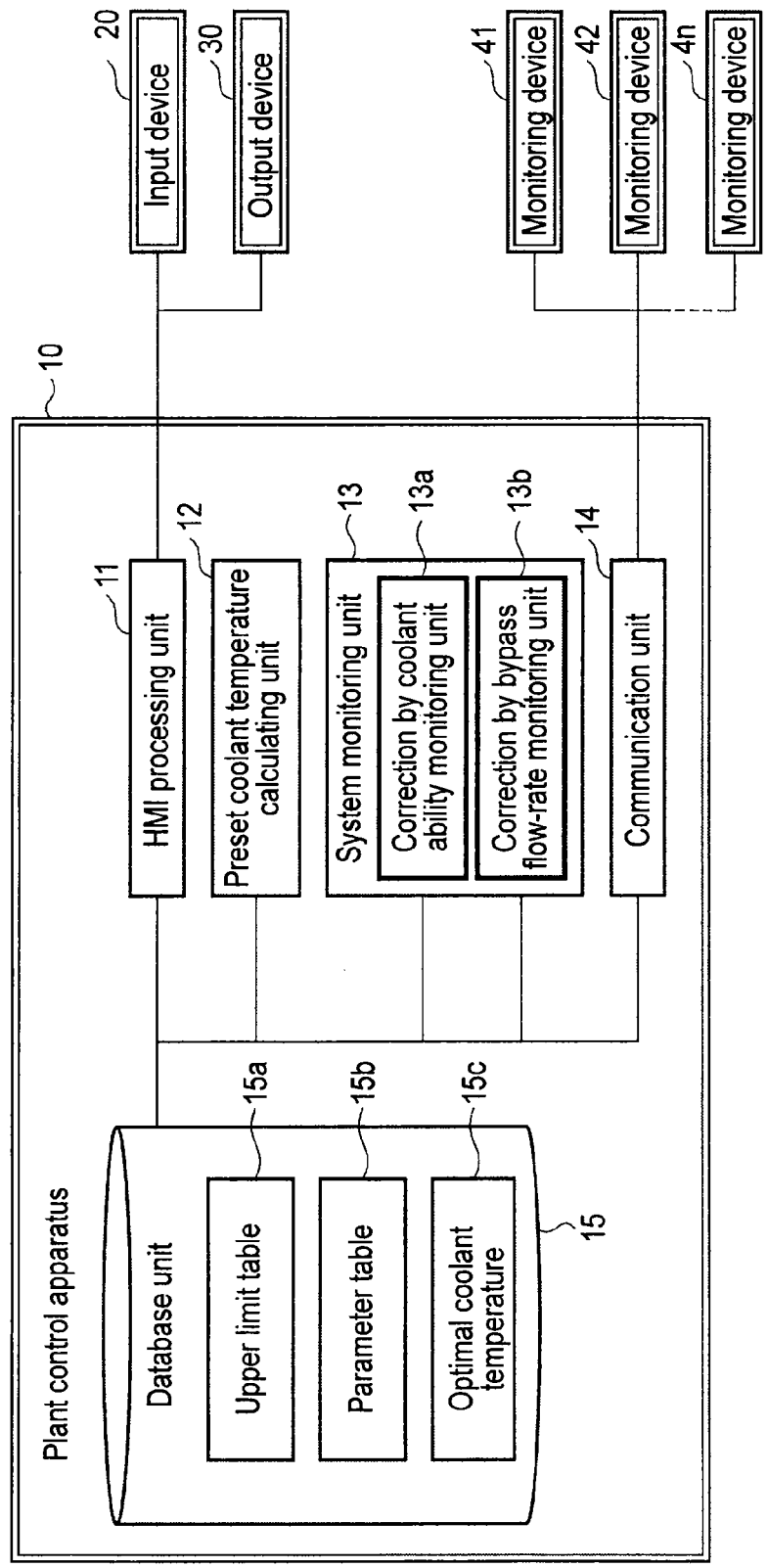
FIG. 3 is a functional block diagram of the exemplary plant control apparatus 10 shown in FIG. 2.

In general, according to one embodiment, a thermal recycling plant system includes a cooler cools coolant recycling thermal from coolant circulating in a load apparatus and which consumes energy while operating and a controller controls the cooler. The controller includes a calculator and a monitor. The calculator calculates an optimal temperature optimal for the coolant by optimization calculation for minimizing energy consumption under given conditions. The monitor monitors an operating state of the load apparatus to determine whether an abnormality exists in the load apparatus. The monitor controls the cooler to cool the coolant to a temperature lower than the optimal temperature calculated, on determining that an abnormality exists in the load apparatus.

FIG. 1 is a block diagram showing an exemplary thermal recycling plant. The embodiment describes an example of a system that can control the thermal recycling plant of FIG. 1. In FIG. 1, the arrows indicate the directions in which coolant (for example, water) flows. The coolant recycles thermal from a plurality of coolant load apparatuses 500, flows through a pipe system and reaches cold/heat source apparatuses 100. The coolant load apparatuses 500 are components to be cooled, including household air-conditioners, pure water producers and outdoor air-conditioning units.

The outdoor air-conditioning unit is an apparatus configured to process outdoor air (fresh air) to be supplied to rooms. The outdoor air-conditioning unit consumes electric power to adjust the temperature and humidity of the air taken from outside. A parameter important to the outdoor air-conditioning unit is the air supply dew point. The air supply dew point must be appropriately controlled in order to prevent condensation in the air-conditioning ducts.

Each cold/heat source apparatus 100 is a cooling apparatus, also known as a "chiller". It cools the coolant on, for example, the principle of the heat pump. The thermal recycled from the coolant is transferred to a heat radiating system (not shown), and is ultimately radiated outside the building, by the dump heat exchanger or radiator mounted on the roof. Some of the cold/heat source apparatuses 100 are driven to recycle thermal. How many should be driven depends on how much thermal must be recycled. The cold/heat source apparatuses 100 consume much energy. In order to save energy, it is therefore necessary to drive as few cold/heat source apparatuses 100 as possible to achieve desirable air-conditioning.

The cooling function of the thermal recycling plant depends mainly on both the coolant temperature and the coolant flow rate. If the coolant temperature is low, the coolant flow rate can be small to attain a desirable cooling function. Conversely, if the coolant temperature is high, the coolant flow rate must be large to attain the same cooling function. The term "flow rate" used here means either the amount of the coolant flowing per unit time in the thermal recycling plant, or the amount of the coolant flowing per unit time in the bypass. This is because the flow rate in the bypass directly reflects the rate at which the coolant flows in the entire plant.

In the existing technique, a feedback is applied to set raise the coolant temperature in order to save energy. The coolant flow rate inevitably falls too much. As a result, additional cold/heat source apparatuses 100 are driven, ultimately increasing the energy consumption and hence the running cost of the thermal recycling plant. In view of this, the embodiment is configured to apply a feedback in a specific way, thereby driving cold/heat source apparatuses 100 in a minimum number, while maintaining a sufficient cooling capability and achieving energy saving, as will be explained blow.

Needless to say, sufficient cooling capability may not be attained even if the coolant temperature is reduced as much as possible. In this case, additional cold/heat source apparatuses 100 must be activated. This embodiment does not exclude such an operation of the thermal recycling plant. That is, the embodiment is designed to control the plant in accordance with not only the coolant temperature, but also the coolant flow rate, thereby to accomplish energy saving.

In order to circulate the coolant between the cold/heat source apparatuses 100, on the one hand, and the coolant load apparatuses 500, on the other, a primary pump 700 is provided at the inputs of the cold/heat source apparatuses 100, and a secondary pump 300 at the outputs of the cold/heat source apparatuses 100. Further, a primary header 200 and a secondary header 400 are provided at the input port and output port of a secondary pump 300, respectively. Thus, the pipes are efficiently arranged.

Moreover, a return header 600 is provided on a path extending from the coolant load apparatuses 500 to the primary pump 700. A coolant bypass route 800 extends from the primary header 200 to the return header 600. In the bypass route 800, part of the coolant flows (circulates), returning to the cold/heat source apparatuses 100, without flowing through the coolant load apparatuses 500. The flow rate of the coolant flowing in the bypass route 800 is a barometer that indicates the margin of cooling capability of the cooling system. If the coolant flow rate decreases, the standby cold/heat source apparatuses will be activated, inevitably to increase the power consumption.

FIG. 2 is a system diagram showing an exemplary thermal recycling plant control system according to the embodiment. As shown in FIG. 2, device/sensor groups 61 to 6p as controlled objects include cold/heat source apparatuses 1, temperature sensors 2, flow rate sensors 3, outdoor air-conditioning unit 4 and pumps 5 and so on. The cold/heat source apparatuses 1 include the cold/heat source apparatuses 100 shown in FIG. 1.

The temperature sensors 2 are, for example, sensors configured to measure the temperature and humidity outside the outdoor air-conditioning units 4. The temperature sensors 2 measure also the air supply dew points at the cold/heat source apparatuses 1 and outdoor air-conditioning units 4. The flow rate sensors 3 measure the rates at which the coolant flows in the pipe system, particularly the rate at which the coolant flows in the bypass route 800.

Device/sensor groups 61 to 6p are controlled by control devices 51 to 5p, respectively. Control devices 51 to 5p are connected to, for example, a monitoring device 41. Monitoring device is installed on each floor of, for example, a building. Hence, in most cases, several monitoring devices (41 to 4n) are used in the building. Each of control devices 51 to 5p functions at positions very close to the components it controls. Each control device gives control commands to the cold/heat source apparatuses 1, outdoor air-conditioning units 4, pumps 5, etc., and acquires sensor data from the temperature sensors 2 and flow rate sensors 3, etc.

The data, such as the values and operating states and preset values acquired at, for example, the data acquisition points in device/sensor group 61, is collected in control device 51 and then transmitted to monitoring device 41. Monitoring device 41 stores the data received from control device 51, in an internal database (not shown). In the internal database, the data is held for a prescribed time (for example, 48 hours) or longer.

Monitoring device 41 transmits commands to control devices 51 to 5*p*, in accordance with the control logic set in it or with the control command or set value changing command coming from a higher control device. In response to a command coming from monitoring device 41, control device 51 supplies preset values or operating state data to device/sensor group 61. Monitoring device 41, control device 5*m* and device/sensor group 6*m* operate in a similar relationship. Also, monitoring device 4*n*, control device 5*p* and device/sensor group 6*p* operate in a similar relationship. Monitoring devices 41 to 4*n* are connected to the plant control apparatus 10 via a communication network, such as a local area network (LAN) provided in the building.

The plant control apparatus 10, monitoring devices 41 to 4*n* and control devices 51 to 5*p* perform hierarchical monitoring and controlling on device/sensor groups 61 to 6*p*, through the communication network. BACnet (registered trademark) is a representative protocol for the communication network.

The communication network is not limited to a LAN. It may be an Internet Protocol (IP) network or a virtual private network (VPN) of the system vendor. That is, the plant control apparatus 10 need not be installed in the same building as device/sensor groups 61 to 6*p*. Rather, the plant control apparatus 10 can be installed at a site geographically far from the building.

The plant control apparatus 10 comprises an input device 20 and an output device 30, both used as human-machine interfaces. The input device 20 is, for example, a mouse, a keyboard or a touchpanel. The output device 30 is, for example, a liquid crystal display. The user may use these devices to visually confirm the data about the process the plant control apparatus 10 has performed, and input numerical values and characters to the plant control apparatus 10.

FIG. 3 is a functional block diagram showing an example of the plant control apparatus 10 shown in FIG. 2. As shown in FIG. 2, the plant control apparatus 10 may comprise a human-machine interface (HMI) processing unit 11, a preset coolant temperature calculating unit 12, a system monitoring unit 13, a communication unit 14, and a database unit 15. Of these components, the preset coolant temperature calculating unit 12, system monitoring unit 13 and communication unit 14 are process functions performed by an arithmetic operation based on the program stored in, for example, the program memory (not shown) incorporated in a central processing unit (CPU). The intervals at which to perform these process functions are performed can be set, independently of one another.

The HMI processing unit 11 is connected to the input device 20 and output device 30, and has the function of giving various data to the user and the function of receiving data from the user. Thus, the HMI processing unit 11 enables the system and the user to exchange data. The data the HMI processing unit 11 has received is stored in the database unit 15.

The preset coolant temperature calculating unit 12 calculates a preset coolant temperature for the thermal recycling plant from the given conditions (for example, environmental conditions such as temperature and humidity, or the air-conditioning temperature and humidity the user has set), by means of optimization, mainly in order to minimize the energy consumption. The data necessary for this calculation is obtained from the database unit 15 or monitoring devices 41 to 4*n*. The calculated values (hereinafter called the "optimal preset coolant temperature") are saved in the database unit 15.

The optimal preset coolant temperature is the best possible temperature at which to maintain the coolant for the purpose of saving energy. In the existing control system, this preset coolant temperature so calculated as described above is the sole control value.

The system monitoring unit 13 performs a function associated with the monitoring and controlling of the thermal recycling plant. The system monitoring unit 13 monitors the operating states of, particularly, the coolant load apparatuses 500, and determines whether the coolant load apparatuses 500 have an abnormality or not. If any coolant load apparatus 500 is found to have an abnormality, the system monitoring unit 13 controls the cold/heat source apparatus 100, whereby the coolant is cooled to a temperature lower than the optimal preset coolant temperature.

To be more specific, if the system monitoring unit 13 detects any abnormality in the thermal recycling plant, the temperature of the coolant is reduced below the optimal preset coolant temperature. In order to reduce the temperature of the coolant in this manner, a predetermined correction value (a value by which to change the temperature at a time) is preset.

The communication unit 14 communicates with monitoring devices 41 to 4*n*, exchanging data with monitoring devices 41 to 4*n* and transmitting the preset values and control data to device/sensor groups 61 to 6*p*. The database unit 15 holds, in its storage area, an upper limit table 15*a*, a parameter table 15*b*, and an optimal coolant temperature 15*c*.

The upper limit table 15*a* is a table of various upper limits of the preset coolant temperatures, each associated with, for example, the absolute atmospheric humidity. In the upper limit table 15*a*, the lower limits of the preset coolant temperatures can be registered, too. The parameter table 15*b* is a table registering the parameters for use in calculating the optimal coolant temperature (for example, the atmospheric temperature and humidity sensed by sensors). The optimal coolant temperature 15*c* is the optimal preset coolant temperature actually calculated.

The system monitoring unit 13 comprises a cooling capability monitoring unit 13*a* and a bypass flow rate monitoring unit 13*b*, which are process functions utilized in the embodiment.

The cooling capability monitoring unit 13*a* determines that the thermal recycling plant has an abnormality, if the difference between the temperature measured by the temperature sensor 2 and the temperature set to the coolant load apparatus 500 remains greater than a preset value for a prescribed time or longer. This preset temperature value may depend on the optimal preset coolant temperature. Or, this preset temperature value accords with the user's demand, and may not depend on the optimal preset coolant temperature. In the latter case, the preset temperature value is fixed at the dew point at the outdoor air-conditioning unit, and the plant control apparatus 10 needs only to maintain the outdoor air-conditioning unit at the dew point, irrespective of the changes in the temperature of cold water.

The cooling capability monitoring unit 13*a* calculates a correction value for the optimal preset coolant temperature, so that the load apparatuses, such as outdoor air-conditioning units 4, may not be insufficiently dehumidified. The correction value calculated for correcting the optimal preset coolant temperature will hereinafter be called "correction value ΔT1".

In the embodiment, correction value ΔT1 is added to the optimal preset coolant temperature, providing a corrected optimal preset coolant temperature. Since correction value added lowers the temperature, the correction value is negative in most cases. The corrected optimal preset coolant temperature will be referred to as the "optimal preset coolant temperature (corrected)". Correction value ΔT1 is stored in the database unit 15, together with the optimal preset coolant temperature (corrected).

The bypass flow rate monitoring unit 13b determines that the thermal recycling plant has an abnormality, if the flow rate in the bypass route 800 (FIG. 1), detected by any flow rate sensor 3 falls outside the predetermined reference range. Then, the bypass flow rate monitoring unit 13b calculates a correction value for the optimal preset coolant temperature, so that the cold/heat source apparatus 100 may not be unnecessarily activated, even if the bypass flow rate decreases. The correction value calculated at this point will hereinafter be called "correction value ΔT2".

Correction value ΔT2 calculated by the bypass flow rate monitoring unit 13b can be used, independently of correction value ΔT1 calculated by the cooling capability monitoring unit 13a. The corrected optimal preset coolant temperature, which has been corrected in accordance with the coolant flow rate, will also be referred to as the "optimal preset coolant temperature (corrected)".

Figure 4:
FIG. 4 is a diagram showing an exemplary screen an output device 30 displays.

FIG. 4 is a diagram showing an exemplary screen the output device 30 of the plant control apparatus 10 displays to enable the user to confirm the operating state of the thermal recycling plant control system. The screen shown in FIG. 4 shows that the preset coolant temperature calculating unit 12 is calculating the optimal preset coolant temperature. The screen shown in FIG. 4 displays icons, indicating that the thermal recycling plant control system has an abnormality.

Figure 5:
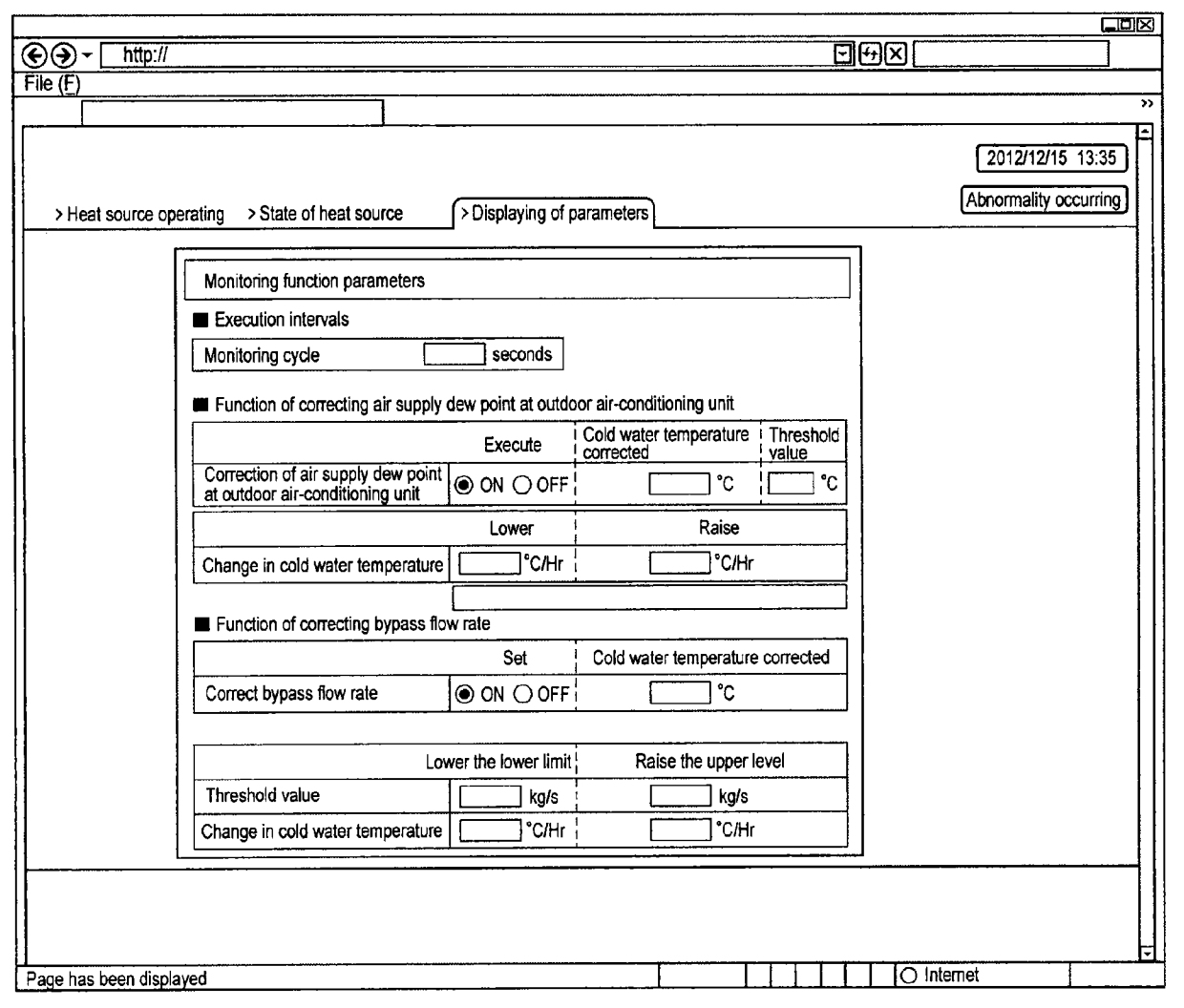

FIG. 5 is a diagram showing another exemplary screen the output device 30 displays to enable the user to change the operating scheme of the plant control apparatus 10. The screen shown in FIG. 5 shows that the function of correcting the air supply dew point at the outdoor air-conditioning unit has been turned on, and that the function of correcting the bypass flow rate has been on. The former function is performed, by mainly the cooling capability monitoring unit 13a. The latter function is performed, by mainly the bypass flow rate monitoring unit 13b.

Figure 6:
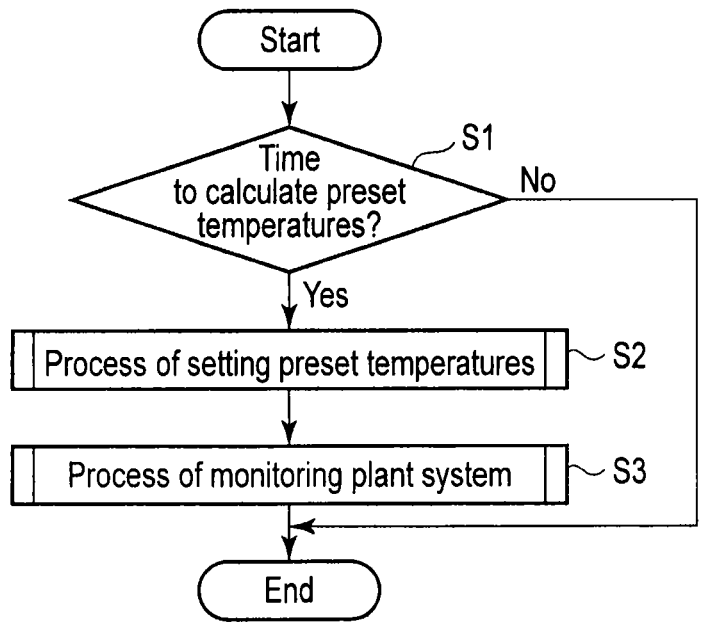
FIG. 6 is a flowchart showing an exemplary process sequence the plant control apparatus 10 may perform.

FIG. 6 is a flowchart showing an exemplary process sequence the plant control apparatus 10 may perform. As FIG. 6 shows, the plant control apparatus 10 keeps waiting for the timing of calculating the optimal preset coolant temperature (Step S1). This timing is based on the control cycles set by using, for example, the HMI processing unit 11. The plant control apparatus 10 repeats this process sequence shown in FIG. 6, each in one control cycle.

When the timing comes, the preset coolant temperature calculating unit 12 calculates the optimal preset coolant temperature (Step 2). Then, the system monitoring unit 13 starts monitoring the thermal recycling plant control system (Step S3). The processes in Steps S2 and S3 may be performed at the same time or at different times, in accordance with the control cycle.

Figure 7:
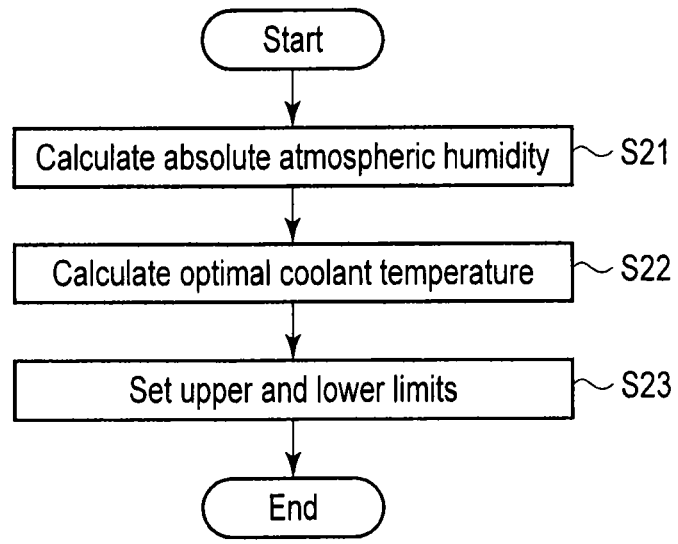
FIG. 7 is a flowchart showing an exemplary process sequence of calculating an optimal preset coolant temperature.

FIG. 7 is a flowchart showing an exemplary process sequence of calculating an optimal coolant temperature. The preset coolant temperature calculating unit 12 acquires the outside temperature and humidity from the parameter table 15b. Then, the preset coolant temperature calculating unit 12 applies the outside temperature to, for example, the Wechsler-Highland approximation, thereby calculating the pressure Psa of saturated water vapor. The preset coolant temperature calculating unit 12 uses the following equations (1) and (2), calculating the absolute atmospheric humidity (Step S21).

$$Pw = Psa \times RH/100 \qquad (1)$$

where Pw is the partial pressure [kPa] of water vapor, Psa is the pressure [kPa] of saturated water vapor, and Rh is the relative humidity [%].

$$X = 0.62198 \times Pw/(P-Pw) \qquad (2)$$

where X is the absolute humidity [kg/kgDA], and P is the total pressure of air (at sea level, 0 m), [kpq]=101.325 kPa.

If the wet bulb atmospheric temperature is 25° C. and the atmospheric humidity is 80%, the absolute atmospheric humidity will be 0.016 kg/kgDA. If monitoring device 41, for example, can directly determine the absolute atmospheric humidity, Step 21 can be skipped.

The preset coolant temperature calculating unit 12 then refers to the upper limit table 15a, and calculates the optimal preset coolant temperature from the absolute atmospheric humidity calculated in Step S21 (Step S22).

Next, the preset coolant temperature calculating unit 12 performs a limit process, finding the upper and lower limits of the optimal preset coolant temperature (Step S23). If the optimal preset coolant temperature greatly changes every time it is calculated, it should not be applied directly to the thermal recycling plant. Therefore, the optimal preset coolant temperature is corrected right after it has been calculated, preventing it from greatly changing from the previous optimal preset coolant temperature by more than a prescribed control margin.

Assume that the control margin is 3.0° C. per hour (i.e., 3.0°/h) and that the preset coolant temperature calculating unit 12 has an operating cycle of 30 minutes. Then, the control margin for each calculation is half the value, i.e., 1.5° C. If the previous optimal preset coolant temperature is 7.2° C., the optimal preset coolant temperature will be calculated as 9.0° C. This increase exceeds the control margin. The preset coolant temperature calculating unit 12 therefore performs the limit process, correcting the optimal preset coolant temperature will to 8.7° C. The optimal preset coolant temperature, so corrected, is registered in the database unit 15 (thus, the optimal preset coolant temperature is now 15° C.) The control margin involving the limit process may be set to the thermal recycling plant control system beforehand. Alternatively, it may be input at such an input screen as shown in FIG. 8.

FIG. 8 is a diagram showing an exemplary screen the output device 30 displays, guiding the user to input the control margin that involves the limit process of Step 23. The screen has a window, in which the items (*1, 2, 3, . . . ) are displayed in the row of actual cycles and the upper and lower limits of the water (coolant) temperature are set in association with the absolute atmospheric temperature.

Figures 9, 10:
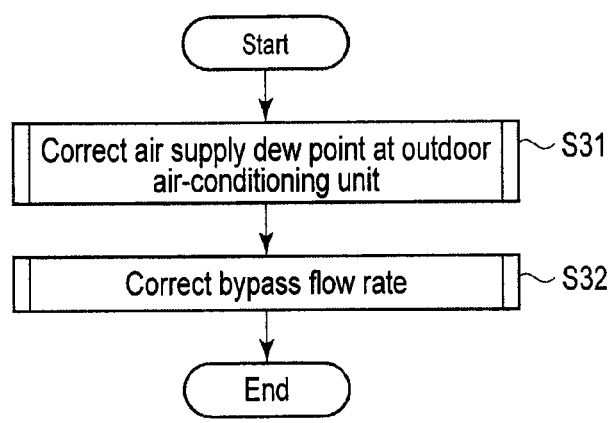

FIG. 9 is a diagram showing an example of a preset coolant temperature upper limit table 15a. The preset coolant temperature upper limit table 15a is a table in which the upper limit and lower limit of the temperature preset for each absolute atmospheric temperature are shown, associated with each other. The absolute atmospheric temperature can be set in a range of, for example, 0.0000 to 0.0400 kg/kgDA. The coolant temperatures set for the absolute atmospheric humidities of 0.0000 and 0.0400, respectively, are automatically set to the values for the most similar atmospheric humidities.

The items that can be set in the preset coolant temperature upper limit table 15$a$ are limited in number. It would therefore be advisable to read two preset absolute atmospheric humidities (for example, 0.0000 and 0.0400 kg/kgDA, which are most similar to the absolute atmospheric humidities acquired from the preset coolant temperature upper limit table 15$a$, to derive a linear or non-linear approximation from the two preset absolute atmospheric humidities, and to calculate an optimal preset coolant temperature.

Assume that the preset coolant temperature upper limit table 15$a$ has the content shown in FIG. 9. Also assume that the linear approximation for the absolute atmospheric humidity of 0.0160 kg/kgDA is applied. Then, an approximation of $-500 \times$(absolute humidity)$+17.0=$(optimal preset coolant temperature) will be obtained from items No. 2 and No. 3. If the absolute humidity of 0.0160 kg/kgDA is applied to this approximation, an optimal preset coolant temperature of 9.0° C. will be obtained.

FIG. 10 is a flowchart showing an exemplary process sequence the system monitoring unit 13 may perform. As shown in FIG. 10, the cooling capability monitoring unit 13$a$ incorporated in the system monitoring unit 13 corrects the air supply dew point of the air at the outdoor air-conditioning unit (Step S31). Then, the bypass flow rate monitoring unit 13$b$ corrects the bypass flow rate (Step S32). Note that Step 31 and Step 32 can be switched in the order they are performed. Further, only one of them may be performed.

Figure 11:
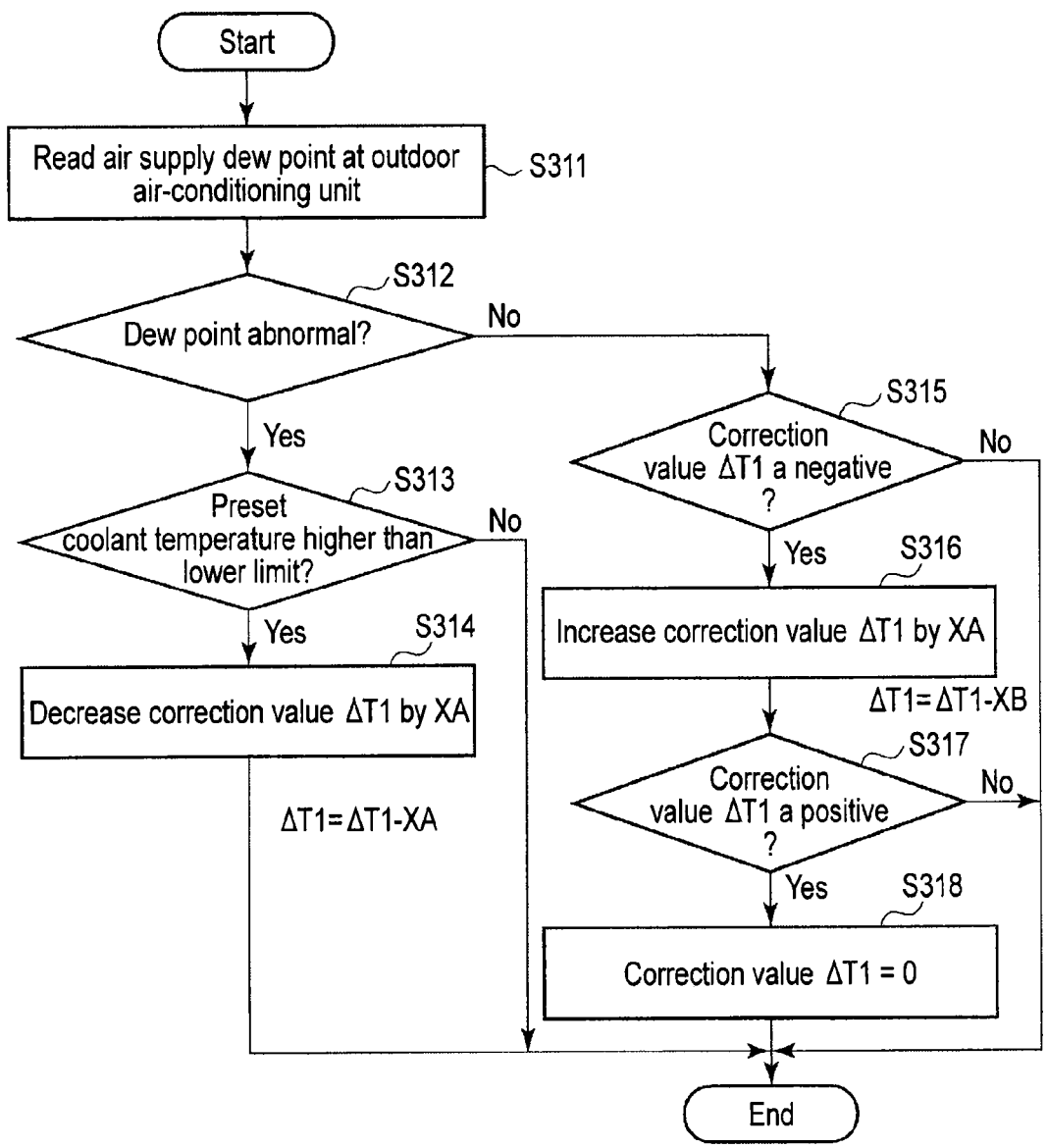
FIG. 11 is a flowchart showing, in detail, a process sequence a cooling capability monitoring unit 13a may perform.

FIG. 11 is a flowchart showing, in detail, a process sequence the cooling capability monitoring unit 13$a$ may perform. The cooling capability monitoring unit 13$a$ reads the data about the outdoor air-conditioning unit from the database unit 15 and determines whether the thermal recycling plant has an abnormality (Step S311). The cooling capability monitoring unit 13$a$ then finds the difference between the air supply dew point of air at the outdoor air-conditioning unit 4 and the temperature detected by the temperature sensor 2. If this difference remains over a prescribed value for a preset reference time, the cooling capability monitoring unit 13$a$ determines that the thermal recycling plant has an abnormality (Step S312). Both the prescribed value and the reference time may be already registered in the system or may be registered by using the HMI processing unit 11. Whether an abnormality has occurred or not is determined for all outdoor air-conditioning units. Even if an abnormality is found in one outdoor air-conditioning unit only, the thermal recycling plant control system will be found not to be functioning well.

If the air supply dew point at the outdoor air-conditioning unit is found to be abnormal (YES in Step S312), the cooling capability monitoring unit 13$a$ determines whether the previous optimal preset coolant temperature is higher than the preset lower limit (Step S313). The lower limit of the coolant temperature has been registered in the system or can be registered by using the HMI processing unit 11. Alternatively, lower limits of the coolant temperature may be set for the absolute atmospheric humidities, respectively, as shown in FIG. 9. In the case of FIG. 9, the lower limits are obtained from the values calculated in Step S21 shown in FIG. 7.

If the previous optimal preset coolant temperature is higher than the preset lower limit (YES in Step S313), correction value $\Delta T1$ is decreased by a preset reference value XA (for example, 0.17) (Step S314), obtaining a correction value $\Delta T1=\Delta T1-XA$, thus obtained, is added to the optimal preset coolant temperature. An optimal preset coolant temperature ((corrected) is thereby obtained.

On the other hand, if the dew point at the outdoor air-conditioning unit is not found to be abnormal (NO in Step S312), the cooling capability monitoring unit 13$a$ determines whether correction value $\Delta T1$ is negative (Step S315). If correction value $\Delta T1$ is negative (YES in Step S315), it is increased by a reference value XB (for example, 0.17) preset beforehand (Step S316). Next, the cooling capability monitoring unit 13$a$ determines whether correction value $\Delta T1$ is positive (Step S317). If correction value $\Delta T1$ is positive (YES in Step 317), the cooling capability monitoring unit 13$a$ zeros the correction value $\Delta T1$ (Step S318). In this case, the optimal preset coolant temperature is not corrected.

FIG. 12 is a flowchart showing, in detail, a process sequence the bypass flow rate monitoring unit 13$b$ may perform. The bypass flow rate monitoring unit 13$b$ reads the coolant bypass flow rate from the database unit 15 (Step S321). The bypass flow rate monitoring unit 13$b$ then determines whether the coolant bypass flow rate is lower than the lower limit value L1 (for example, 250 kg/s) (Step S322).

If the coolant bypass flow rate is found lower than the lower limit value L1 (YES in Step S322), the bypass flow rate monitoring unit 13$b$ determines whether the previous optimal preset coolant temperature is higher than the lower limit (Step S323). If the previous optimal preset coolant temperature is higher than the lower limit (YES in Step S323), the bypass flow rate monitoring unit 13$b$ decreases correction value $\Delta T2$ by a reference value XC (for example, 0.17) (Step S324). Correction value $\Delta T2$ so decreased, i.e., $\Delta T2-XC$, is added to the optimal preset coolant temperature, thereby obtaining an optimal preset coolant temperature (corrected).

In Step S322, the coolant bypass flow rate may be found equal to or higher than the lower limit value L1 (for example, 750 kg/s) (NO in Step S322). In this case, the bypass flow rate monitoring unit 13$b$ determines whether the coolant bypass flow rate is higher than the upper limit value L2 (Step S325). If the coolant bypass flow rate is equal to or higher than the upper limit value L2 (YES in Step S325), the bypass flow rate monitoring unit 13$b$ determines whether correction value $\Delta T2$ is negative (Step S326).

Correction value $\Delta T2$ may be negative (YES in Step S326). In this case, the bypass flow rate monitoring unit 13$b$ increases correction value $\Delta T2$ by a preset reference value XD (for example, 0.17) (Step S327). The bypass flow rate monitoring unit 13$b$ then determines whether correction value $\Delta T2$ so corrected is positive (Step S328). Correction value $\Delta T2$ corrected may be positive (YES in Step S328). Then, the bypass flow rate monitoring unit 13$b$ zeros correction value $\Delta T2$. Each parameter used in the process of FIG. 12 may be registered beforehand in the system or may be input at the HMI processing unit 11.

FIG. 13 is a flowchart showing a process sequence the communication unit 14 performs. The communication unit 14 can perform a process in specific process cycles, for example, one-minute cycles. The communication unit 14 acquires optimal preset coolant temperature from the database unit 15, and outputs the same to a data area that can hold the optimal preset coolant temperatures for the cold/heat source apparatuses monitored and controlled (Step S41). The communication unit 14 can use a protocol such as BACnet (registered trademark). Any optimal preset coolant temperature may be first corrected and then output to the data area so that it may not fall outside a reference range. For example, the optimal preset coolant temperature of 15.1° C. may be corrected to 15.0° C. and then output to the data area, if the upper limit of the temperature is 15.0° C.

The number of decimal places in the optimal preset coolant temperature calculated may differ from the number of decimal places in any optimal preset coolant temperature the cold/heat source apparatus 100 can receive. If this is the case, the cold/heat source apparatus 100 may round off, cut off or round up the optimal preset coolant temperature, thereby correcting the temperature, and may output the optimal preset coolant temperature so corrected. If the temperature so corrected, i.e., the latest optimal preset coolant temperature, has the same value as the previous optimal preset coolant temperature, the cold/heat source apparatus 100 may skip outputting the latest optimal preset coolant temperature.

Next, the communication unit 14 acquires various data about the thermal recycling plant and the data about the atmosphere, which the plant control apparatus 10 uses, from monitoring devices 41 to 4n, control devices 51 to 5p or device/sensor groups 61 to 6p, by using a protocol such as BACnet (registered trademark). The various data, thus acquired, is stored in the database unit 15.

FIG. 14 is a diagram showing exemplary parameters 15b for calculating the optimal coolant temperature. In the embodiment, the optimal preset coolant temperature is calculated at intervals of 10 minutes, the temperature change is limited to 3 degrees (Celsius) per hour, the optimal preset coolant temperature is corrected at intervals of 1 minute, and correction values Δ1 and Δ2 are changed by 0.017° C. each time.

FIG. 15 is a table showing exemplary calculated optimal coolant temperatures, arranged in time series. In the case of FIG. 15, the initial temperature is set to 12.0° C. The table shows the presence and absence of an abnormality, and also the values corrected. In FIG. 15, 0 and 1 indicate the absence of an abnormality and the presence of an abnormality, respectively, based on the detailed correction achieved by the cooling capability monitoring unit 13a. And 0, 1 and 2 indicate the absence of an abnormality, an erroneous lower limit value and an erroneous upper limit value, respectively, based on the detailed correction achieved by the bypass flow rate monitoring unit 13b. In FIG. 15, "Preset Temperature Corrected" is the optimal preset temperature (corrected), more precisely the sum of the optimal preset temperature and correction values Δ1 and Δ2. In accordance with the preset temperature thus corrected, the plant control apparatus 10 controls the thermal recycling plant including the plant control apparatuses 100.

FIG. 16 is a graph showing how various values change for a specific time (2 hours), including the period shown in FIG. 15. As shown in FIG. 16, ΔT1 and ΔT2 are negative after the temperature correction process is started, because the thermal recycling plant has strange cooling capability and the upper and lower limits of the coolant bypass flow rate have unusual values. In FIG. 16, line (a) indicates the optimal preset coolant temperature not corrected in consideration of correction value ΔT1 or ΔT2 calculated by the system monitoring unit 13. Thick line (b) indicates the preset coolant temperature, or optimal preset coolant temperature corrected in accordance with correction values ΔT1 and ΔT2. As seen from FIG. 16, the system monitoring unit 13, which has an additional function, can calculate an optimal preset coolant temperature, in consideration of not only the energy saving characteristic, but also the operating state of the thermal recycling plant.

As described above, not only a preset coolant temperature optimal for saving energy in the thermal recycling plant is calculated in the embodiment, but also the difference between any two values, respectively preset to and actually measured in the thermal recycling plant, is monitored. (For example, the difference between the air supply dew point preset to the outdoor air-conditioning unit and the air supply dew point measured at the outdoor air-conditioning unit is monitored). Then, the optimal preset coolant temperature is corrected in accordance with the difference monitored. The cooling capability of the outdoor air-conditioning unit can therefore be prevented from becoming insufficient to cause an abnormality. Further, in the embodiment, the coolant bypass flow rate is monitored, and the optimal preset coolant temperature is corrected, also in accordance with the coolant bypass flow monitored. As a result, any cold/heat source apparatus in standby state would not be unnecessarily activated. In view of these features, the embodiment is believed to promote energy saving.

Any existing techniques are no more than the calculation of an optimal preset coolant temperature by means of optimization. The coolant load apparatus, such as outdoor air-conditioning unit, may receive an excessive load and may fail to acquire a sufficient dehumidifying capability, inevitably raising the air supply dew point. In such a case, some other coolant load apparatus, which are in standby state, are unnecessarily activated, possibly impairing the energy saving.

By contrast, this embodiment has the function of correcting the optimal preset coolant temperature. This embodiment can therefore provide a thermal recycling plant system, an apparatus for controlling a thermal recycling plant, and a method of controlling a thermal recycling plant, which can keep the thermal recycling plant in a normal operating state, thereby to save energy.

Another Embodiment

Figure 17:
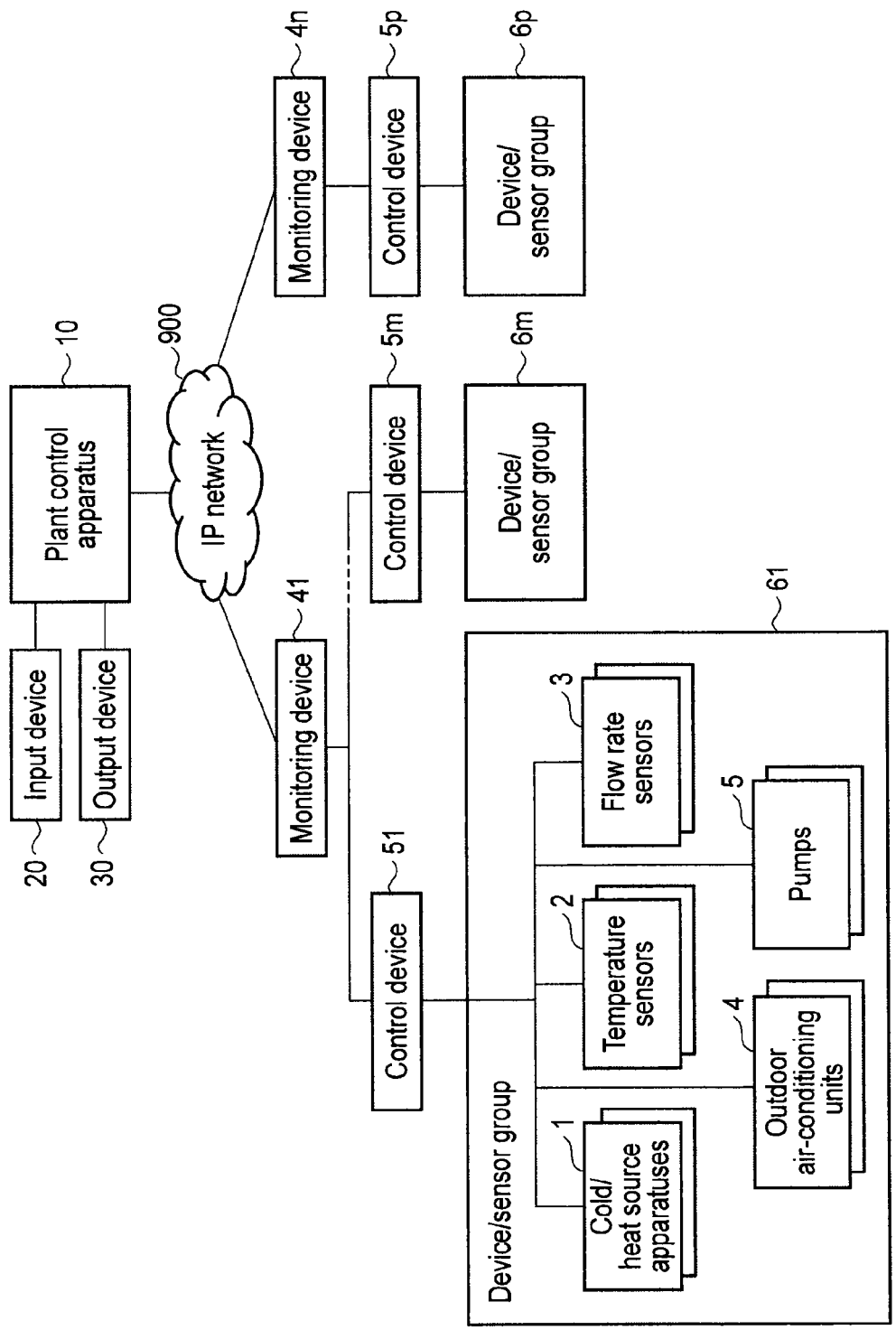
FIG. 17 is a system diagram showing an exemplary thermal recycling plant control system according to another embodiment.

FIG. 17 is a system diagram showing an exemplary thermal recycling plant control system according to another embodiment. In the thermal recycling plant control system shown in FIG. 2, device/sensor groups 61 to 6p, control devices 51 to 5p, monitoring devices 41 to 4n and plant control apparatus 10 are provided on the same network. Nonetheless, this invention is not limited to the configuration shown in FIG. 2. That is, as shown in FIG. 17, the plant control apparatus 10 may be connected via the IP network 900 to device/sensor groups 61 to 6p, control devices 51 to 5p and monitoring devices 41 to 4n. In other words, the plant control apparatus 10 is connected via a data communication network to a plurality of thermal recycling plants, each including cold/heat source apparatuses 1 and plant control apparatuses 100. The plant control apparatus 10 therefore controls each thermal recycling plant via the data communication network.

In this embodiment so configured, one server can accomplish all cold/heat source apparatuses installed in a building or factory. To be more specific, the plant control apparatus 10 first acquires data from the monitoring devices provided in building or factory (sites), then calculates preset coolant temperatures optimal for the respective sites, and finally outputs the data representing the optimal coolant temperatures to the monitoring devices, respectively. To any person with ordinary skill in the art, it would be obvious that a gateway should be used at each site in order to connect the monitoring device to the network 900.

The database unit 15 may store preset coolant temperature upper limit tables 15a, parameters 15b for calculating the optimal coolant temperature and optimal coolant temperature 15c, in the same number as the sites. In addition, the database unit 15 may store a database that holds the data for managing the sites.

The communication unit 14 obtains various data from the registered sites and stores the data in the database unit 15. If any optimal preset coolant temperature is changed, the communication unit 14 outputs the optimal preset coolant temperature to the monitoring device provided at the associated site. The preset coolant temperature calculating unit 12 and the system monitoring unit 13 repeat the process as many times as the sites registered, thereby calculating the preset coolant temperatures for the respective sites. Except for the points described here, the process performed in the second embodiment is identical to the process performed in the first embodiment.

The present invention is not limited to the embodiments described above. Optimal preset coolant temperatures, for example, can, of course, be calculated not only by the method shown in the flowchart of FIG. 7, but also by the known optimization utilizing the evaluation function with respect to the optimal preset coolant temperatures. Further, the functions of monitoring devices 41 to 4n and control devices 51 to 5p may be implemented in the plant control apparatus 10.

In the embodiments described above, whether an abnormality has developed or not is determined from the air supply dew point at the outdoor air-conditioning unit. However, the data from which to determine the existence of an abnormality is limited to the air supply dew point at the outdoor air-conditioning unit. Any data that shows the operating state of the thermal recycling plant and serves to calculate the difference between the actual temperature and the preset temperature can be used, instead, to determine the existence of an abnormality. For example, the temperature of ultra pure water in a pure water producer and the outlet port temperature of a low temperature water circulation system can be utilized for this purpose. Moreover, various data items may be used in combination, to determine the existence of an abnormality.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A thermal recycling plant system comprising:
   a plurality of cooling apparatuses which are configured to cool a coolant that collects heat from load apparatuses and which consume energy while operating;
   a calculator configured to calculate an optimal temperature that is optimal for the coolant by optimization calculation for minimizing energy consumption under given conditions;
   a monitor configured to monitor an operating state of the load apparatuses to determine whether an abnormality exists in the load apparatuses; and
   a controller configured to, upon determining that the abnormality exists in any of the load apparatuses, cool the coolant to a temperature lower than the calculated optimal temperature to minimize the number of cooling apparatuses in operation.

2. The thermal recycling plant system of claim 1, wherein the monitor corrects the temperature of the coolant from the optimal temperature by a prescribed correction value, on determining that the abnormality exists in the load apparatus.

3. The thermal recycling plant system of claim 1, wherein the monitor determines that the abnormality exists if a difference between the temperature of the load apparatus, measured by a temperature sensor, and a preset temperature of the load apparatus remains equal to or larger than a prescribed value, for a prescribed time.

4. The thermal recycling plant system of claim 3, wherein the load apparatus is an outdoor air-conditioning unit, and the temperature sensor measures an air supply dew point at the outdoor air-conditioning unit.

5. The thermal recycling plant system of claim 1, wherein the monitor determines that the abnormality exists if a flow rate of the coolant, measured by a flow rate sensor, falls outside a prescribed reference range.

6. The thermal recycling plant system of claim 5, wherein the flow rate sensor measures the flow rate at which the coolant flows back from outlet ports of the cooling apparatuses to inlet ports thereof.

7. The thermal recycling plant system of claim 1, wherein the controller controls the cooling apparatuses via a data communication network.

8. A control apparatus for controlling a thermal recycling plant which includes a plurality of cooling apparatuses which are configured to cool a coolant that collects heat from load apparatuses and which consume energy while operating, the control apparatus comprising:
   a calculator configured to calculate an optimal temperature that is optimal for the coolant by optimization calculation for minimizing energy consumption under given conditions;
   a monitor configured to monitor an operating state of the load apparatuses to determine whether an abnormality exists in the load apparatuses; and
   a controller configured to, upon determining that the abnormality exists in any of the load apparatuses, cool the coolant to a temperature lower than the calculated optimal temperature to minimize the number of cooling apparatuses in operation.

9. The control apparatus of claim 8, wherein the monitor corrects the temperature of the coolant from the calculated optimal temperature by a prescribed correction value, on determining that the abnormality exists in the load apparatus.

10. The control apparatus of claim 8, wherein the monitor determines that the abnormality exists if a difference between the temperature of the load apparatus, measured by a temperature sensor, and a preset temperature of the load apparatus remains equal to or larger than a prescribed value, for a prescribed time.

11. The control apparatus of claim 10, wherein the load apparatus is an outdoor air-conditioning unit, and the temperature sensor measures an air supply dew point at the outdoor air-conditioning unit.

12. The control apparatus of claim 8, wherein the monitor determines that the abnormality exists if a flow rate of the coolant, measured by a flow rate sensor, falls outside a prescribed reference range.

13. The control apparatus of claim 12, wherein the flow rate sensor measures the flow rate at which the coolant flows back from outlet ports of the cooling apparatuses to inlet ports thereof.

14. The control apparatus of claim 8, which controls the cooling apparatuses via a data communication network.

15. A method of controlling a thermal recycling plant which includes a plurality of cooling apparatuses which are configured to cool a coolant that collects heat from load apparatuses and which consume energy while operating, the method comprising:
   calculating an optimal temperature that is optimal for the coolant by optimization calculation for minimizing energy consumption under given conditions;
   monitoring an operating state of the load apparatuses to determine whether an abnormality exists in the load apparatuses; and
   cooling, upon determining that the abnormality exists in any of the load apparatuses, the coolant to a temperature lower than the calculated optimal temperature to minimize the number of cooling apparatuses in operation.

16. The method controlling a thermal recycling plant, of claim 15, wherein the temperature of the coolant is corrected from the calculated optimal temperature by a prescribed correction value, if the abnormality is determined to exist in the load apparatus.

17. The method controlling a thermal recycling plant, of claim 15, wherein the abnormality is found to exist if a difference between the temperature of the load apparatus, measured by a temperature sensor, and a preset temperature of the load apparatus remains equal to or larger than a prescribed value, for a prescribed time.

18. The method controlling a thermal recycling plant, of claim 17, wherein the load apparatus is an outdoor air-conditioning unit, and the temperature sensor measures an air supply dew point at the outdoor air-conditioning unit.

19. The method controlling a thermal recycling plant, of claim 15, wherein the abnormality is determined to exist if a flow rate of the coolant, measured by a flow rate sensor, falls outside a prescribed reference range.

20. The method controlling a thermal recycling plant, of claim 19, wherein the flow rate sensor measures the flow rate at which the coolant flows back from outlet ports of the cooling apparatuses to inlet ports thereof.

* * * * *